United States Patent
Levitian et al.

(10) Patent No.: US 11,951,357 B1
(45) Date of Patent: Apr. 9, 2024

(54) PLATFORM FOR VISUAL TRACKING OF USER FITNESS

(71) Applicant: Roku, Inc., San Jose, CA (US)

(72) Inventors: Karina Levitian, Austin, TX (US);
Sunil Ramesh, Cupertino, CA (US);
Michael Cutter, Golden, CO (US);
Preethi Parasseri Narayanan, Cupertino, CA (US)

(73) Assignee: Roku, Inc., San Jose, CA (US)

( * ) Notice: Subject to any disclaimer, the term of this patent is extended or adjusted under 35 U.S.C. 154(b) by 26 days.

(21) Appl. No.: 18/071,870

(22) Filed: Nov. 30, 2022

(51) Int. Cl.
*A63B 24/00* (2006.01)
*A63B 71/06* (2006.01)
(Continued)

(52) U.S. Cl.
CPC ...... *A63B 24/0075* (2013.01); *A63B 71/0622* (2013.01); *G06T 7/292* (2017.01); *G06T 13/40* (2013.01); *G06T 13/80* (2013.01); *A63B 2024/0068* (2013.01); *A63B 2024/0096* (2013.01); *A63B 2071/0625* (2013.01); *A63B 2071/0647* (2013.01); *A63B 2220/05* (2013.01); *A63B 2220/17* (2013.01); *A63B 2220/40* (2013.01); *A63B 2220/806* (2013.01);
(Continued)

(58) Field of Classification Search
CPC . A63B 24/0075; A63B 71/0622; G06T 7/292; G06T 13/40; G06T 13/80
See application file for complete search history.

(56) References Cited

U.S. PATENT DOCUMENTS

| | | | | |
|---|---|---|---|---|
| 6,132,337 A | * | 10/2000 | Krupka | A61B 5/02438 482/8 |
| 8,230,367 B2 | * | 7/2012 | Bell | G06V 40/20 463/32 |

(Continued)

OTHER PUBLICATIONS

Hannan, "TensorFlow's New Model MoveNet Explained", (Jul. 22, 2021) https://medium.com/@samhannan47/tensorflows-new-model-movenet-explained-3bdf80a8f073, retrieved Apr. 27, 2023.
(Continued)

*Primary Examiner* — Malina D. Blaise
(74) *Attorney, Agent, or Firm* — McDonnell Boehnen Hulbert & Berghoff LLP (57) ABSTRACT

In one aspect, an example method includes (i) receiving, from one or more cameras in a viewing environment of a content-presentation device, video of a user performing a fitness exercise in the viewing environment; (ii) using the received video and a skeletal detection model to estimate skeletal movement of the user; (iii) generating a synthetic video representing the user moving according to the estimated skeletal movement; (iv) based on a comparison of the estimated skeletal movement with predefined reference skeletal movement representing desired skeletal movement for the fitness exercise, and while the user is performing the fitness exercise, continually calculating a metric representing a difference between the estimated skeletal movement and the reference skeletal movement; and (v) causing the content-presentation device to concurrently display the generated synthetic video, a reference video representing the reference skeletal movement, and an indication of the metric.

20 Claims, 7 Drawing Sheets

(51) Int. Cl.
  *G06T 7/292* (2017.01)
  *G06T 13/40* (2011.01)
  *G06T 13/80* (2011.01)
(52) U.S. Cl.
  CPC ..... *A63B 2220/836* (2013.01); *A63B 2225/20* (2013.01); *A63B 2225/74* (2020.08); *A63B 2230/06* (2013.01); *G06T 2207/10016* (2013.01); *G06T 2207/30196* (2013.01)

(56) References Cited

U.S. PATENT DOCUMENTS

| | | | | |
|---|---|---|---|---|
| 8,523,667 | B2* | 9/2013 | Clavin | G06V 40/103 |
| | | | | 715/810 |
| 8,702,485 | B2* | 4/2014 | Flury | A63F 13/46 |
| | | | | 463/7 |
| 9,610,476 | B1* | 4/2017 | Tran | A63F 11/00 |
| 10,586,369 | B1* | 3/2020 | Roche | G10L 13/00 |
| 2001/0056241 | A1* | 12/2001 | Nissila | A61B 5/222 |
| | | | | 600/483 |
| 2008/0221487 | A1* | 9/2008 | Zohar | A61B 5/1127 |
| | | | | 600/595 |
| 2009/0269728 | A1* | 10/2009 | Verstegen | A63B 21/00069 |
| | | | | 434/247 |
| 2012/0143358 | A1* | 6/2012 | Adams | G06F 3/04815 |
| | | | | 700/92 |
| 2013/0295539 | A1* | 11/2013 | Wilson | H04N 9/3185 |
| | | | | 434/247 |
| 2017/0017462 | A1* | 1/2017 | Kubiak | H04R 3/04 |
| 2017/0293742 | A1* | 10/2017 | Sadeghi | G16H 50/50 |
| 2017/0296873 | A1* | 10/2017 | Kitamura | H04Q 9/00 |
| 2018/0226146 | A1* | 8/2018 | Aragones | G16H 20/60 |
| 2021/0154529 | A1* | 5/2021 | Barr | G06T 13/40 |
| 2022/0072377 | A1* | 3/2022 | Russell | G06V 10/25 |
| 2023/0071274 | A1* | 3/2023 | Trehan | G06F 3/167 |

OTHER PUBLICATIONS

Bazarevsky et al., "BlazePose: On-device Real-time Body Pose tracking", arXiv:2006:10204v1 [cs.CV] Jun. 17, 2020.

* cited by examiner

PLATFORM FOR VISUAL TRACKING OF USER FITNESS

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example computing system is described. The computing system is configured for performing a set of acts including (i) receiving, from one or more cameras in a viewing environment of a content-presentation device, video of a user performing a fitness exercise in the viewing environment; (ii) using the received video and a skeletal detection model to estimate skeletal movement of the user; (iii) generating a synthetic video representing the user moving according to the estimated skeletal movement; (iv) based on a comparison of the estimated skeletal movement with predefined reference skeletal movement representing desired skeletal movement for the fitness exercise, and while the user is performing the fitness exercise, continually calculating a metric representing a difference between the estimated skeletal movement and the reference skeletal movement; and (v) causing the content-presentation device to concurrently display the generated synthetic video, a reference video representing the reference skeletal movement, and an indication of the metric.

In another aspect, an example method performed by a computing system is described. The method includes (i) receiving, from one or more cameras in a viewing environment of a content-presentation device, video of a user performing a fitness exercise in the viewing environment; (ii) using the received video and a skeletal detection model to estimate skeletal movement of the user; (iii) generating a synthetic video representing the user moving according to the estimated skeletal movement; (iv) based on a comparison of the estimated skeletal movement with predefined reference skeletal movement representing desired skeletal movement for the fitness exercise, and while the user is performing the fitness exercise, continually calculating a metric representing a difference between the estimated skeletal movement and the reference skeletal movement; and (v) causing the content-presentation device to concurrently display the generated synthetic video, a reference video representing the reference skeletal movement, and an indication of the metric.

In another aspect, a non-transitory computer-readable medium is described. The non-transitory computer-readable medium has stored thereon program instructions that upon execution by a computing system, cause performance of a set of acts. The set of acts includes (i) receiving, from one or more cameras in a viewing environment of a content-presentation device, video of a user performing a fitness exercise in the viewing environment; (ii) using the received video and a skeletal detection model to estimate skeletal movement of the user; (iii) generating a synthetic video representing the user moving according to the estimated skeletal movement; (iv) based on a comparison of the estimated skeletal movement with predefined reference skeletal movement representing desired skeletal movement for the fitness exercise, and while the user is performing the fitness exercise, continually calculating a metric representing a difference between the estimated skeletal movement and the reference skeletal movement; and (v) causing the content-presentation device to concurrently display the generated synthetic video, a reference video representing the reference skeletal movement, and an indication of the metric.

DETAILED DESCRIPTION

I. Overview

Modern content-presentation devices, such as content-presentation devices in the homes or other premises of end-users, are increasingly equipped with functions aimed to improve user experience. These content-presentation devices may range from smart televisions to set-top boxes to video game consoles.

Content-presentation devices such as these and others can improve user experience in a wide variety of areas. One such area is fitness, within which existing technologies can include software and hardware for tracking a user's physical fitness and related activities. Such software and hardware can be implemented in contexts in which the user exercises alone, or with a virtual community, in association with a live fitness instructor or pre-recorded video of a fitness instructor, for instance. However, existing fitness platforms can be costly and can require additional hardware for their programming to operate. Additionally, improvements to the user experience of existing fitness platforms are often desired, particularly for users seeking improved feedback on their immediate and long-term progress.

Disclosed herein are methods and systems for visual tracking of user fitness. In an example method, a computing system receives, from one or more cameras in a viewing environment of a content-presentation device, video of a user performing a fitness exercise in the viewing environment, and uses the received video and a skeletal detection model to estimate skeletal movement of the user. The computing system then generates a synthetic video representing the user moving according to the estimated skeletal movement. Based on a comparison of the estimated skeletal movement with predefined reference skeletal movement representing desired skeletal movement for the fitness exercise, and while the user is performing the fitness exercise, the computing system continually calculates a metric representing a difference between the estimated skeletal movement and the reference skeletal movement. The computing system also causes the content-presentation device to concurrently display the generated synthetic video, a reference video representing the reference skeletal movement, and an indication of the metric.

As such, using camera technology and the content-presentation device, the user can view their own performance relative to a reference video—as well as receive feedback as to the quality of their performance—in real-time, thereby improving user experience. Using the disclosed methods and systems, individual fitness instructors can provide fitness instructions and build a customer base. The above-described operations and other related operations described herein can be implemented through use of a fitness software application installed on the content-presentation device, for instance.

Furthermore, in an example embodiment, the computing system can take the form of a control system of the content-presentation device itself. For example, the operations described herein can be performed by a control system integrated into a television set that is communicatively coupled to (or is integral with) one or more cameras, thus reducing or eliminating the need for additional hardware or software and the cost associated therewith. These and other advantages and improvements are discussed in more detail below.

Various other features of these systems and methods are described hereinafter with reference to the accompanying figures.

II. Example Architecture

Figure 1:
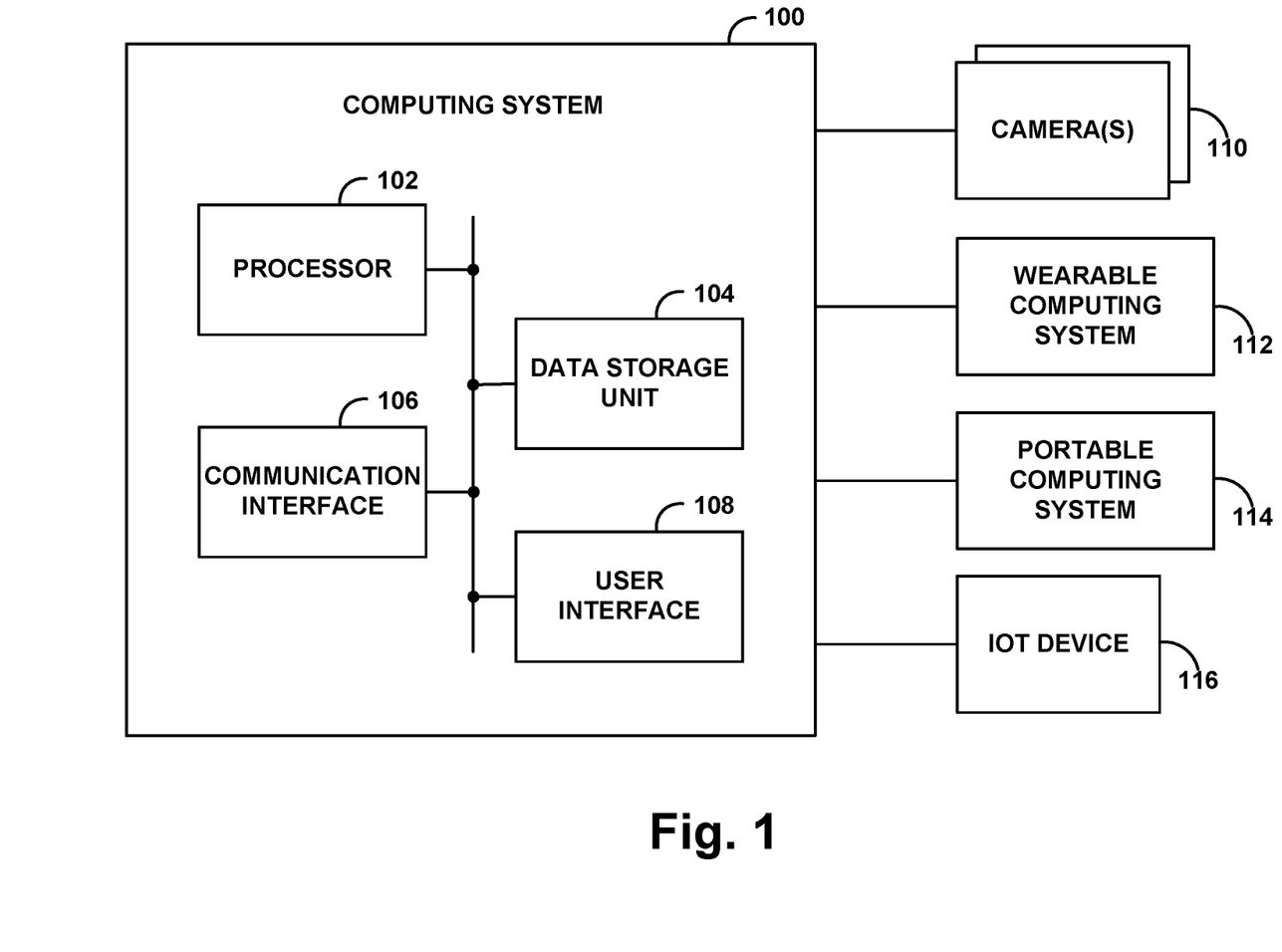
FIG. 1 is a simplified block diagram of an example computing system in which various described principles can be implemented.

FIG. 1 is a simplified block diagram of an example computing system 100. The computing system 100 can be configured to perform and/or can perform one or more operations, such as the operations described in this disclosure. The computing system 100 can include various components, such as a processor 102, a data-storage unit 104, a communication interface 106, and/or a user interface 108.

The processor 102 can be or include a general-purpose processor (e.g., a microprocessor) and/or a special-purpose processor (e.g., a digital signal processor). The processor 102 can execute program instructions included in the data-storage unit 104 as described below.

The data-storage unit 104 can be or include one or more volatile, non-volatile, removable, and/or non-removable storage components, such as magnetic, optical, and/or flash storage, and/or can be integrated in whole or in part with the processor 102. Further, the data-storage unit 104 can be or include a non-transitory computer-readable storage medium, having stored thereon program instructions (e.g., compiled or non-compiled program logic and/or machine code) that, upon execution by the processor 102, cause the computing system 100 and/or another computing system to perform one or more operations, such as the operations described in this disclosure. These program instructions can define, and/or be part of, a discrete software application.

In some instances, the computing system 100 can execute program instructions in response to receiving an input, such as an input received via the communication interface 106 and/or the user interface 108. The data-storage unit 104 can also store other data, such as any of the data described in this disclosure.

The communication interface 106 can allow the computing system 100 to connect with and/or communicate with another entity according to one or more protocols. Therefore, the computing system 100 can transmit data to, and/or receive data from, one or more other entities according to one or more protocols. In one example, the communication interface 106 can be or include a wired interface, such as an Ethernet interface or a High-Definition Multimedia Interface (HDMI). In another example, the communication interface 106 can be or include a wireless interface, such as a cellular or WI-FI interface.

The user interface 108 can allow for interaction between the computing system 100 and a user of the computing system 100. As such, the user interface 108 can be or include an input component such as a keyboard, a mouse, a remote controller, a microphone, and/or a touch-sensitive panel. The user interface 108 can also be or include an output component such as a display device (which, for example, can be combined with a touch-sensitive panel) and/or a sound speaker.

The computing system 100 can also include one or more connection mechanisms that connect various components within the computing system 100 and that connect the computing system 100 to other devices. For example, the computing system 100 can include the connection mechanisms represented by lines that connect components of the computing system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The computing system 100 can include one or more of the above-described components and can be configured or arranged in various ways. For example, the computing system 100 can be configured as a server and/or a client (or perhaps a cluster of servers and/or a cluster of clients) operating in one or more server-client type arrangements, for instance.

As shown, the computing system 100 can include, or be communicatively coupled to (e.g., via a connection mechanism), one or more cameras 110. Any one of the one or more cameras 110 can take the form of a monocular camera, high-resolution infrared (IR) camera, or other type of camera. In some examples, any such camera can be a camera mounted on or near a television set (e.g., above or below the television set), a camera integrated into the television set, a camera that is or is integrated into an Internet of Things (IoT) device, a smartphone camera, a laptop camera, or a tablet camera, among other possibilities. Further, in some examples, any such camera can include one or more microphones and/or one or more motion sensors (e.g., gyroscope or accelerometer). The computing system 100 can be configured to receive and process data received from the one or more cameras 110.

As further shown, the computing system 100 can be coupled to a wearable computing system 112, a portable computing system 114, and an IoT device 116.

The wearable computing system 112 can take the form of a smartwatch or other form factor that can be worn by a user, such as a belt, a ring, glasses, shoes, pants, shoes, etc. The wearable computing system 112 can include one or more of the above-described components of the computing system 100 (e.g., a processor, data storage unit, and communication interface) and/or can include various other components, such as an actuator device (e.g., pushbutton), a microphone, a lidar sensor, a radar sensor, an IR sensor, a camera, a light source, a display device, and/or a speaker. In some examples, such components can include an optical heart sensor, an electrical heart sensor, blood oxygen sensor, an accelerometer, a gyroscope, and/or other sensors that facilitate health monitoring operations performed by the wearable computing system 112 or by the computing system 100 based on data received from one or more such sensors of the wearable computing system 112. In some cases, the wearable computing system 112 can be considered an IoT device 116.

The portable computing system 114 can be or include a laptop computer, smartphone, tablet computer, and/or other computing system capable of being easily moved. In some cases, a personal desktop computer can be considered a portable computing system. The portable computing system 114 can include one or more of the above-described components of the computing system 100 (e.g., a processor, data storage unit, and communication interface) and/or can include various other components such as any of those described above.

The IoT device 116 can take the form of a computing system, such as a "smart home" device such as a connected appliance, utility, light, switch, power outlet, or speaker. The IoT device 116 can include one or more of the above-described components of the computing system 100 (e.g., a processor, data storage unit, and communication interface) and/or can include various other components such as any of those described above. In some embodiments, the IoT device 116 can be a battery-powered IoT device and can thus include a battery. The IoT device 116 can communicate with other IoT devices or any other computing system described herein and share data over an IoT network, such as a local area network (LAN) or other type of computer network.

In some cases, the computing system 100 can take the form of a controller of a content-presentation device configured to provide media content (e.g., video programming, such as streaming video) for display to a user in a viewing environment of the content-presentation device. The controller can be located in the content-presentation device itself—that is, the computing system 100 can be a controller that is onboard the content-presentation device (e.g., the content-presentation device's local controller, housed within a physical housing of the content-presentation device)—or can be located remote from, but communicatively coupled to, the content-presentation device.

Herein, a "viewing environment" can refer to an environment, such as a room of a house, within which end-users can view media content that is provided for display by the content-presentation device. The content-presentation device can be or include a television set, a set-top box, a television set with an integrated set-top box, a video game console, a desktop computer, a laptop computer, a tablet computer, a mobile phone, a speaker (e.g., a soundbar mounted below the television set), or a home appliance, among other possibilities.

Although not explicitly shown in FIG. 1, any two or more of the camera(s) 110, the wearable computing system 112, the portable computing system 114, and the IoT device 116 can be connected by a connection mechanism. For example, the computing system 100, one or more cameras 110, and the portable computing system 114 can all be connected to each other and can share data with each other. Other examples are possible as well.

III. Example Operations

The computing system 100 and/or components thereof can be configured to perform and/or can perform one or more operations. Examples of these operations and related features will now be described with reference to FIGS. 2, 3, 4, 5, 6, and 7.

Figure 2:
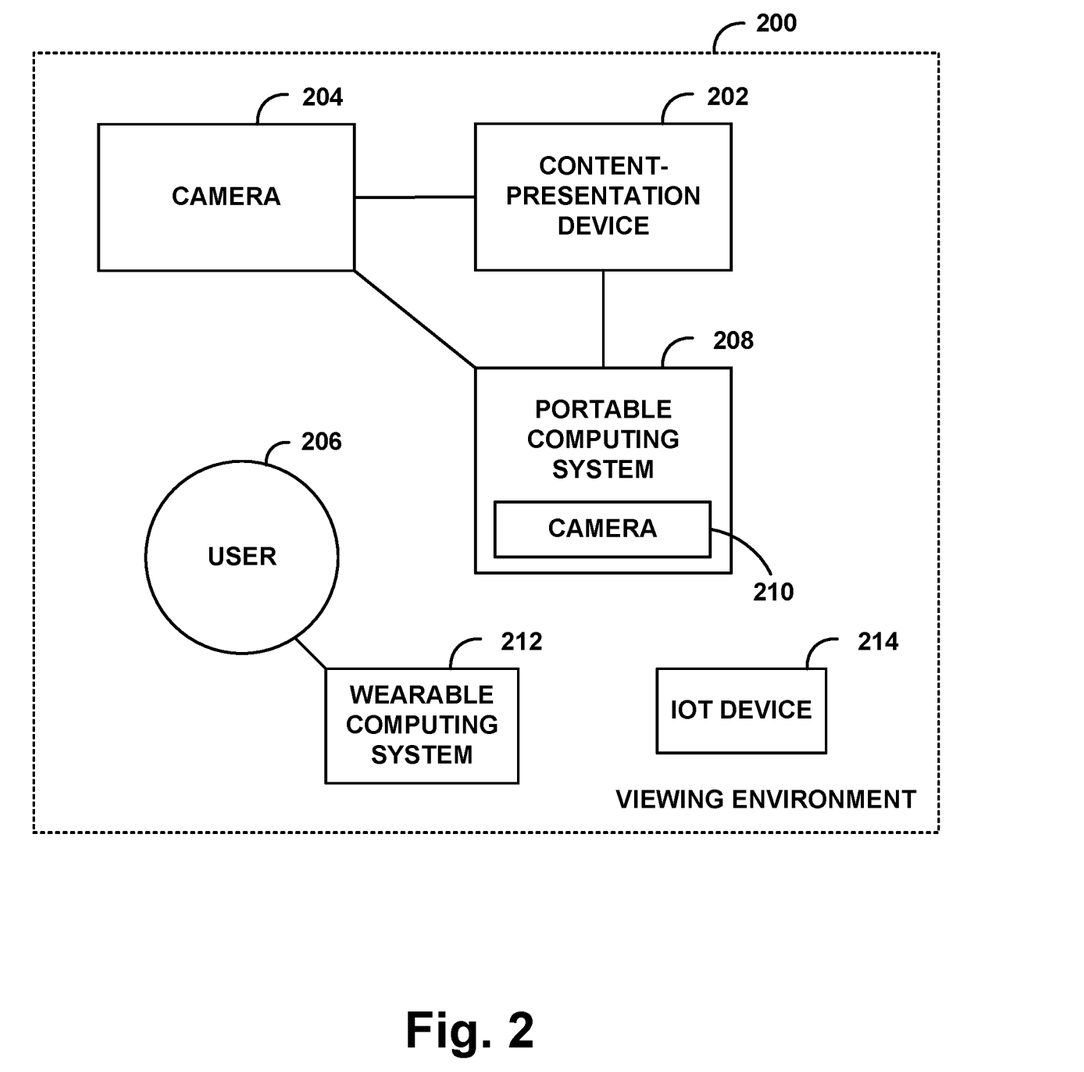
FIG. 2 depicts an example viewing environment of a content-presentation device.

FIG. 2 depicts an example viewing environment 200 of a content-presentation device 202. The content-presentation device 202 can be a computing system such as computing system 100. Thus, the disclosed operations can be performed by the content-presentation device 202. However, it should be understood that a computing system other than the content-presentation device 202 can be configured to perform any one or more of the operations described herein.

As further shown in FIG. 2, a camera 204 can be communicatively coupled to the content-presentation device 202 and configured to capture video of a user 206 (i.e., an end-user) present in the viewing environment 200. The camera 204 can take the form of any one of the types of cameras discussed above with respect to the one or more cameras 110, or can take an alternative form.

As further shown, a portable computing system 208 can be communicatively coupled to the content-presentation device 202 and the camera 204. The portable computing system 208 can take any of the forms described above with respect to portable computing system 114, and can include a camera 210. Camera 210 can take the form of any one of the types of cameras discussed above with respect to the one or more cameras 110 or an alternative form. In an example, the portable computing system 208 is a laptop computer and camera 210 is integrated with the laptop computer or is external to, and mounted to, the laptop computer.

As further shown in FIG. 2, a wearable computing system 212 (e.g., wearable computing system 112) and an IoT device 214 (e.g., IoT device 116) can be present in the viewing environment 200 as well. For instance, the wearable computing system 212 can be a smartwatch worn by the user 206 and the IoT device 214 can be a smart speaker system.

In operation, the computing system 100 receives, from one or more cameras (e.g., camera 204) in the viewing environment 200, video of the user 206 performing a fitness exercise in the viewing environment 200. In some examples, the computing system 100 can send an instruction to the one or more cameras to capture the video and transmit the video to a processor of the computing system 100.

The computing system 100 uses the received video and a skeletal detection model to estimate skeletal movement of the user 206. To facilitate this, the computing system 100 can perform local frame processing. For example, the computing system 100 can estimate a pose of the user 206 for each of multiple different frames of the video using the skeletal detection model. In some instances, the skeletal detection model can detect and track a set of skeletal landmarks over the course of a sequence of frames of the video. That is, the skeletal detection model can include a machine learning model that uses image analysis to detect and identify the position of the user's body in a frame using the set of skeletal landmarks. The set of skeletal landmarks can correspond to different body parts (e.g., a shoulder, hip, arm, leg, or facial feature), and the relative positions of the skeletal landmarks can change for different poses.

The skeletal detection model can take any of a variety of forms depending on the desired implementation. One example of a skeletal detection model is BlazePose developed by Google AI™, which outputs pose information in the form of the pixel positions of 33 skeletal landmarks. Other examples include MoveNet and PoseNet provided by TensorFlow.

The computing system 100 generates a synthetic video representing the user 206 moving according to the estimated skeletal movement.

Within examples, the computing system 100 can generate a sequence of frames including an avatar for the user 206 that is performing the estimated skeletal movement and then renders the synthetic video using these frames. In some instances, the frames can include pixels representing the avatar, and other pixels representing a background, which in some cases can be transparent pixels, so as to have the background of the synthetic video be the same background in the received video (e.g., a living room or other example of the viewing environment 200).

Within other examples, the synthetic video can take the form of a live video of the user 206 that is being captured by the one or more cameras. That is, the live video might include the user 206 instead of an avatar thereof. The computing system 100 can modify (e.g., crop) the video in some way in some cases.

In some instances, the computing system 100 can generate the synthetic video to include an avatar that is a mirror-image of the user 206 by flipping the frames of the synthetic video horizontally. The computing system 100 can be configured to provide this as a selectable option for the user 206 (e.g., via the user interface), or can generate the synthetic video in this way automatically.

Based on a comparison of the estimated skeletal movement with predefined reference skeletal movement representing desired skeletal movement for the fitness exercise, and while the user 206 is performing the fitness exercise, the computing system 100 continually calculates a metric representing a difference between the estimated skeletal movement and the reference skeletal movement. Within examples, the computing system 100 can continually calculate a distance metric between the two movements. In one embodiment, the computing system 100 can continually calculate a distance metric between the user's skeletal movement and the computer generated movement of the body in the perfect exercise form. This can be calculated by identifying reference points on the user's physical body (e.g., shoulders, elbows, neck, head, knees, ankles, etc.) and comparing them to the positioning of the associated reference points on the perfect exercise form. For example, this embodiment can identify that a user is positioning their ankle in the wrong position in comparison to their knee position in a lunge and can recommend a user to correct their form.

The computing system 100 causes the content-presentation device 202 to concurrently display the generated synthetic video, a reference video representing the reference skeletal movement, and an indication of the metric. For example, the computing system 100 can transmit instructions to the content-presentation device 202 that, upon receipt by the content-presentation device 202, cause the content-presentation device 202 to perform the displaying. In embodiments where the computing system 100 is a control system of the content-presentation device 202, this can involve the processor of the computing system 100 transmitting instructions to a display device of the content-presentation device 202.

As such, in real-time, the computing system 100 can evaluate the user's form (e.g., by continually calculating the metric) and provide visual feedback to the user in the form of the metric, as well as in the addition form of a visual representation of the user's movement relative to the correct form for the fitness exercise.

Within examples, the reference video can be or include an avatar of another user (e.g., a fitness instructor) generated in a similar manner as the synthetic video. The computing system 100 can receive and store data representing the reference skeletal movement (e.g., from a server in communication with the computing system 100) or can estimate the reference skeletal movement itself. In a specific example, the computing system 100 can receive an instructional video of a fitness instructor performing the fitness exercise, use the instructional video and the skeletal detection model to estimate skeletal movement of the fitness instructor, and then select the estimated skeletal movement of the fitness instructor to be the reference skeletal movement. Thus, the computing system 100 can be configured to ingest videos of workout routines to analyze the skeletal movements of the instructors and generate baselines to display and be used as reference when calculating the metric.

Within other examples, the reference video can be or include a video (e.g., a live video or a pre-recorded video) of another user (e.g., a fitness instructor) performing the fitness exercise. In a specific embodiment, the user 206 can log onto the computing system 100 to watch a livestream of an instructor performing the fitness exercise and the computing system 100 can generate and display the feedback described herein so the user 206 can evaluate their form in real-time while watching the livestream.

Figure 3:
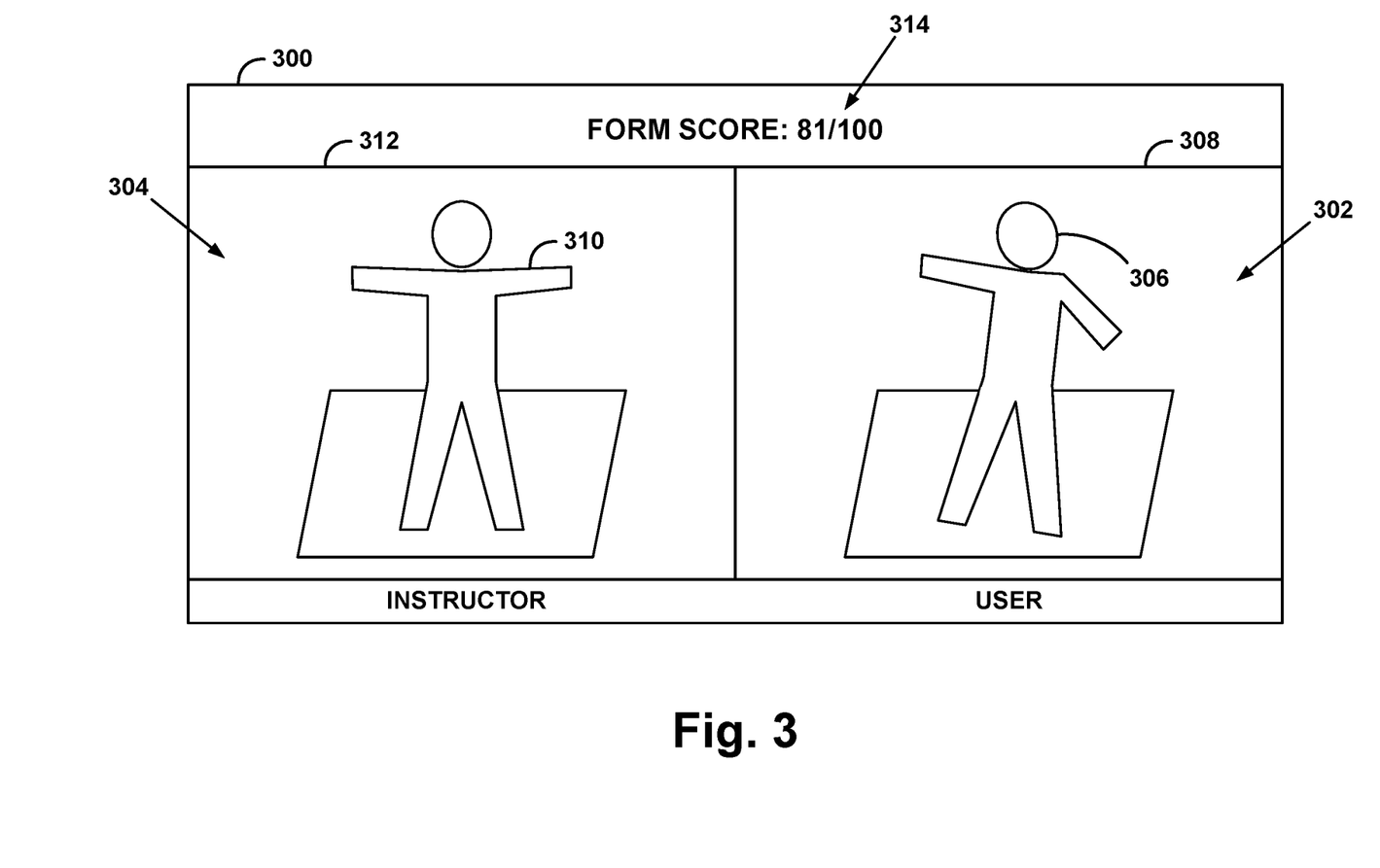
FIG. 3 depicts an example user interface for fitness tracking.

FIG. 3 depicts an example user interface 300. Within examples, and with reference to FIG. 3, the act of concurrently displaying the synthetic video 302 and the reference video 304 involves concurrently displaying a first avatar 306 of the user 206 moving according to the estimated skeletal movement in a first region 308 of the user interface 300 and a second avatar 310 (i.e., of an instructor) moving according to the reference skeletal movement in a second region 312 of the user interface 300, different from the first region 308. In some instances, a live video of the user 206 can be displayed instead of the first avatar 306 and/or a live video of the instructor can be displayed instead of the second avatar 310.

As further shown in FIG. 3, the indication of the metric is displayed concurrently with the synthetic video 302 and the reference video 304, particularly in the form of a form score 314, by way of example. The form score 314 is relative to the desired form for performance of the fitness exercise. As a more specific example, the form score 314 in FIG. 3 is a score out of one hundred. In operation, the form score 314 displayed can change, as it is continuously calculated and updated as the user 206 performs the fitness exercise.

Figure 4:
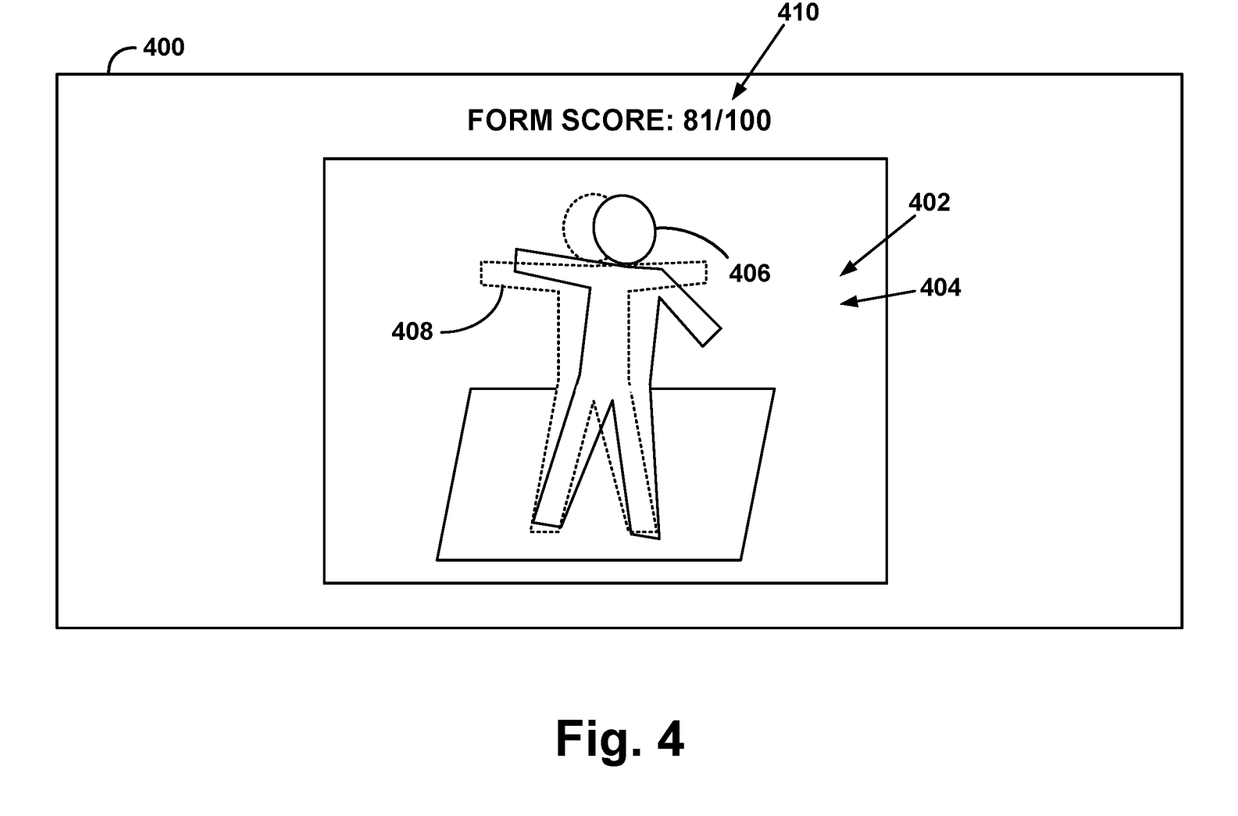
FIG. 4 depicts another example user interface for fitness tracking.

FIG. 4 depicts another example user interface 400. Within examples, and with reference to FIG. 4, the act of concurrently displaying the synthetic video 402 and the reference video 404 involves concurrently displaying a first avatar 406 of the user 206 moving according to the estimated skeletal movement and, overlaid over the first avatar 406, a second avatar 408 moving according to the reference skeletal movement. In some instances, the second avatar 408 can be at least partially transparent, so as to allow the user 206 to easily keep track of their avatar's own movements relative to the second avatar 408. Further, in some instances, a live video of the user 206 can be displayed instead of the first avatar 406 and/or a live video of the instructor can be displayed instead of the second avatar 408.

As further shown in FIG. 4, the indication of the metric is displayed concurrently with the synthetic video 402 and the reference video 404 in the form of a form score 410, by way of example.

Within examples, the computing system 100 can determine that the metric meets a set of one or more conditions and, in response to determining that the metric meets the set of one or more conditions, (i) generate a modified version of the synthetic video that depicts an avatar of the user 206 correcting form by bringing the estimated movement into alignment with the reference skeletal movement and (ii)

cause the content-presentation device 202 to display the modified version of the synthetic video. The set of one or more conditions can include, by way of example, a condition that the metric is lower than a predefined threshold (e.g., a threshold distance metric) and/or a condition that a predefined time-period has expired. As a more particular example, if the computing system 100 determines that the metric has been lower than a predefined threshold (e.g., a form score of 50 out of 100) for longer than a predefined threshold time-period (e.g., thirty seconds), the computing system 100 can generate and display the modified version of the synthetic video so as to show the user 206 how to correct their form. As another example, the computing system 100 might generate and display the modified version of the synthetic video as soon as the metric has fallen below the predefined threshold, regardless of how much time has elapsed. Other examples are possible as well.

In some cases, the computing system 100 can pause the reference video so that the user 206 can have more time to watch the modified version of the synthetic video. In other cases, the computing system 100 can display the modified version of the synthetic video in real-time along with the reference video and the indication of the metric.

In related embodiments, the computing system 100 can determine that the metric meets the set of one or more conditions described above or a different set of conditions and, in response, can cause the content-presentation device 202 to instruct the user 206 to perform a different fitness exercise. For example, if the computing system 100 determines that the metric has been lower than a predefined threshold (e.g., a form score of 30 out of 100) for longer than a predefined threshold time-period (e.g., five minutes), the computing system 100 can have the content-presentation device 202 instruct the user 206 to perform a difference fitness exercise and can begin displaying a reference video for that different exercise. That is, if the user 206 has excessive divergence from the proper form of the fitness exercise, it might be an indication that the fitness exercise is too difficult for the user 206. Thus, it can be helpful for the computing system 100 to suggest a different exercise in that scenario.

The computing system 100 can be configured to perform other operations in response to determining that the metric meets a set of one or more conditions, additionally or alternatively to those described above. By way of example, in response to determining that the metric meets the set of one or more conditions, computing system 100 can cause the content-presentation device 202 and/or the IoT device 214 in the viewing environment 200 to perform one or more actions of a set of actions. The set of actions can include, for example, playing audio in the viewing environment and/or emitting light in accordance with one or more light control parameters.

Emitting light can take various forms, such as emitting a particular color or colors of light, emitting light at a particular frequency (e.g., flashing the light on and off at a particular frequency), and/or emitting light at a particular brightness, among other possibilities. As such, the light control parameters can be or include, for instance, brightness, color, and/or frequency at which to emit the light.

Playing audio can take various forms, such as playing audio at a particular volume, pitch, etc., among other possibilities. As such the audio can be played in accordance with one or more audio control parameters such as volume and pitch.

For example, the IoT device 214 can be or include a light unit and an audio output device (e.g., a speaker with an array of light-emitting diodes) and, in response to determining that the metric has fallen below a predefined threshold, the computing system 100 can instruct the IoT device 214 to perform an action such as emitting a red light, decreasing the volume of the reference video, and/or decreasing the volume of music that the user 206 is currently playing from a personal playlist, among other possibilities. Any one or more of these actions can provide a warning to the user 206 that their form is deviating from what is desired.

As another example, in response to determining that the metric has fallen below a predefined threshold, the computing system 100 can instruct the content-presentation device 202 to play a sound effect (e.g., via an integrated speaker or external speaker of the content-presentation device 202) and/or alter a user interface in some way, such as by changing the background color of the synthetic video or by providing some sort of other visual indication.

In some cases, light from the IoT device 214 can be used as an alternative to the indication of the metric displayed by the content-presentation device 202. Furthermore, audio and/or light can be used to provide feedback to the user 206 in situations where the user 206 is performing the fitness exercise correctly. For instance, in response to the metric exceeding a predefined threshold of 80 out of 100, the computing system 100 can cause the content-presentation device 202 and/or the IoT device 214 to increase the volume of music being played out by the content-presentation device 202 and/or the IoT device 214. Other examples are possible as well.

Example embodiments can also involve the computing system 100 using health-related data in addition to the received video in order to perform various actions, including those that affect the display for the user 206. This health-related data can be or include various types of data, examples of which are described in more detail below. The health-related data can also be received from one or more sources, such as the wearable computing system 212 shown in FIG. 1. In some instances, the wearable computing system 212 can be a smartwatch worn by the user 206 while performing the fitness exercise.

In some instances, the computing system 100 can receive, from the wearable computing system 212, gyroscope data and/or accelerometer data. Based on that data, and further based on the synthetic video, the computing system 100 can calculate a number of reps performed by the user 206. Within examples, frames of the received video and/or the synthetic video can be analyzed to recognize and track movement of the user 206 performing repetitions of the fitness exercise and determine when a rep has been completed. Additionally or alternatively, the gyroscope data and/or accelerometer data can be compared to one or more predefined thresholds to determine when a rep has been completed.

Based on the calculated number of reps performed by the user 206, the computing system 100 can cause the content-presentation device 202 and/or the IoT device 214 in the viewing environment 200 to perform one or more actions of a set of actions. The set of actions can include playing audio in the viewing environment 200 and/or emitting light in accordance with one or more light control parameters, for example. Audio playout and light emission can be performed in the same or similar manner as described above. As a specific example, the computing system 100 can control the content-presentation device 202 and/or the IoT device 214 to play a sound each rep and then, based on a comparison of the rep count to a threshold, to play a different sound when the user 206 has completed the threshold number of reps.

In some instances, the computing system 100 can receive, from the wearable computing system 212, heart rate data for the user 206, such as data obtained by a heart sensor on the wearable computing system 212.

Based on the received heart rate data, the computing system 100 can cause the content-presentation device 202 and/or the IoT device 214 in the viewing environment 200 to perform one or more actions of a set of actions. The set of actions can include playing audio in the viewing environment 200 and/or emitting light in accordance with one or more light control parameters, for example. Audio playout and light emission can be performed in the same or similar manner as described above. As a specific example, the computing system 100 can control the content-presentation device 202 and/or the IoT device 214 to flash lights at approximately the same rate as the user's heart rate.

In some instances, the computing system 100 can control audio and/or lighting based on a mood of at least a portion of the fitness exercise. For example, the computing system 100 can receive the reference video along with one or more tags, each corresponding to a respective temporal portion of the reference video and each indicating one of a plurality of predefined moods. As a more specific example, a fitness exercise and corresponding reference video can include a rigorous portion (e.g., intense cardio and/or weighted workouts) and a rest portion (e.g., yoga, Pilates, stretching, or guided medication). Using tags indicating this, the computing system 100 can change the color and/or increase the brightness of light in the viewing environment 200 during the rigorous portion of the fitness exercise and then change the color to something else and/or decrease the brightness of light during the rest portion. Other examples are possible as well.

Heath-related data can also be used to help suggest to the user 206 that they perform a different fitness exercise. For example, based on the heart rate data (alone, or in combination with the metric meeting certain conditions), the computing system 100 can cause the content-presentation device 202 to instruct the user 206 to perform a different fitness exercise. The act of instructing the user 206 to perform a different fitness exercise can involve playing out an audio message, displaying a video message, and/or changing the reference video to a different reference video for a different fitness exercise, among other possibilities. As a more specific example, if the computing system 100 determines that the user's heart rate is too high and/or that the metric has fallen below a predefined threshold for a predefined time-period, the computing system 100 can responsively change the reference video to that of a different, less intense fitness exercise.

In some embodiments, over time, the health-related data can be combined with the metric and recorded video of the user 206 performing various exercises in order to track the user's fitness level and recommend a fitness program to the user 206 based on the user's past performance in other exercises. For instance, for a given fitness exercise, the computing system 100 can generate, store, and cause the content-presentation device 202 to display information, such as a graph or other visual indication, showing the user's progress over repeated attempts at performing that fitness exercise. Such information can include, for each session of the fitness exercise, the metric over time, a number of reps, and the user's average heart rate. The computing system 100 can also be configured to enable the user 206 to use an input device (e.g., a remote control) to manually enter information such as a number of reps, an amount of weight lifted, etc.

In some embodiments, camera data from at least two cameras can be used to capture video of the user 206 from different angles. This video can be synergized and processed to better estimate the user's skeletal movement, and, as a result, better assess the user's form. To facilitate this, the computing system 100 can process each camera view to predict a post of the user's body, after which the computing system 100 can optimize the intersection of predicted joint position to maximize the likelihood of joint configuration given the observations from each camera and predefined data corresponding to the known human skeleton form. Additionally, in some cases, the processing power of an external device, such as a device having one of the additional cameras, can be leveraged to reduce the computational burden on the computing system 100. Examples related to these concepts will now be described in more detail. The use of two or more cameras can increase accuracy and provide information about a user's skeletal movements that would not be visible to one camera. For example, if a user is facing their back towards one camera there would be limited information available about the user's skeletal movements of the arms or knees but when two cameras are available in the environment the multiple cameras would allow for capture of multiple views of the user's skeletal movements including the arms and knees.

In an example embodiment, the computing system 100 can receive the video from a first camera (i.e., camera 204) mounted proximate to the content-presentation device 202 (e.g., mounted on or below a televisions set) and a second camera (i.e., camera 210 of the portable computing system 208) located within the viewing environment 200. Thus, the video can be or include first video of the user 206 performing the fitness exercise from a first angle and second video of the user 206 performing the fitness exercise from a second angle, different from the first angle. The portable computing system 208 can be a smartphone, laptop computer, or tablet computer, etc., that is configured to execute a fitness-themed software application associated with the content-presentation device 202. In situations where latency might exist in this embodiment, the computing system 100 can perform various operations to reduce latency. In an example, the second camera can perform compression and down-sampling prior to transmission, which can will greatly reduce the overall latency as the payload to transmit will be diminished by an order of magnitude. To achieve this, the portable computing system 208 can use dedicated processors for image compression. In another example, the second camera and the portable computing system 208 can make use of embedded generalized matrix multiplication integer coprocessors (e.g., Neural Processing Units (NPUs)) to perform efficient low power deep learning inference. Thus, the portable computing system 208 can perform deep learning inference and transmit the human joint positions (and omit the image). The computing system 100 can then fuse the inference result of the second camera with the data from first camera.

In some instances, at least a portion of the operations described herein can be performed in whole or in part by a processor or processors of the portable computing system 208. Such operations can be or include estimating the skeletal movement of the user 206, generating the synthetic video, and/or continually calculating the metric.

In some embodiments, the synthetic video can include additional details that indicate to the user 206 what parts of their body are involved in the fitness exercise. For example, the synthetic video can include an avatar of the user 206 moving according to the estimated skeletal movement, where the avatar includes (e.g., as an overlay over the avatar itself, or as part of the avatar itself) a visual indication of one or more muscles targeted by the fitness exercise. The visual indication can be provided before, during, or after the user's performance of the fitness exercise. As an example of providing the visual indication after the user has stopped performance of the fitness exercise, the computing system 100 can, in response to the performance being completed, cause the content-presentation device 202 to provide (e.g., the next time the user 206 logs on, or immediately after completion of the performance) an avatar of the user 206 that includes muscle(s) that are highlighted or otherwise emphasized in order to indicate to the user 206 that those muscles are in recovery as a result of performance of the fitness exercise.

In related examples, the computing system 100 can additionally or alternatively be configured to display muscle(s) being targeted by the fitness exercise in the reference video (e.g., as part of an avatar of the fitness instructor), display a worded list of the targeted muscle(s), or indicate the targeted muscle(s) in some other way on the user interface. Other examples are possible as well.

Figure 5:
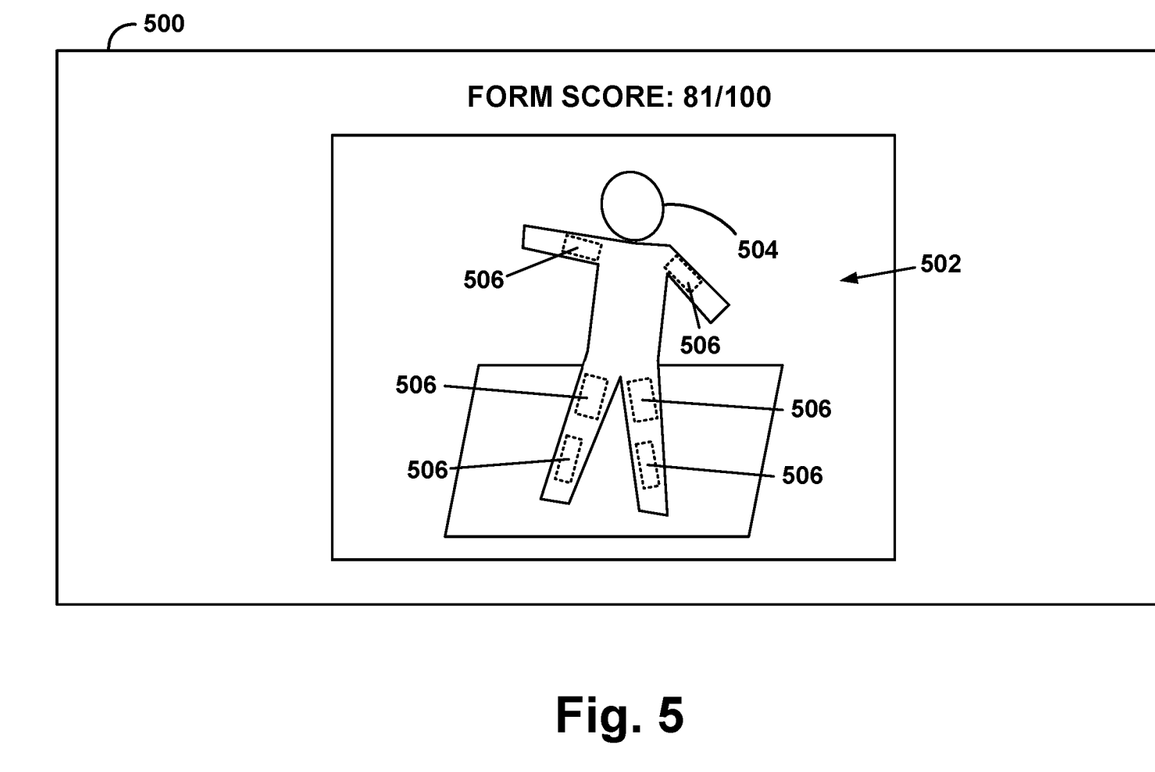
FIG. 5 depicts another example user interface for fitness tracking.

FIG. 5 depicts another example user interface 500. As shown, the synthetic video 502 includes an avatar 504 of the user 206 moving according to the estimated skeletal movement. Further, the avatar 504 includes muscles 506 that are emphasized in the manner described above.

In some embodiments, the computing system 100 can be configured to, at certain intervals (e.g., every week, every month, etc.), process the received video using the skeletal detection model, an edge detection model, and/or other techniques in order to update previously-stored avatar data for the user 206. As a result, the updated avatar can reflect growth in the user's muscles and overall physique. Additionally or alternatively, the computing system 100 can be configured to update the avatar in response to determining that a threshold number of fitness exercises have been performed and/or in response to determining that a particular time-period (e.g., one month) has expired from a particular reference time-point (e.g., when the user 206 first logs onto the computing system 100 to begin exercising).

In some embodiments, the computing system 100 can be configured to provide for the user 206 selectable options to change the lighting characteristics of the synthetic video and/or the reference video to match the user's surroundings, or to otherwise change the background of the synthetic video and/or the reference video.

For example, the computing system 100 can cause the content-presentation device 202 to display a user interface with a selectable option that, when selected by the user 206 (e.g., using a remote control), causes the computing system 100 to generate, in real-time, a modified version of the reference video based on the synthetic video and/or based on the received video. In particular, for instance, the modified version of the reference video can include the avatar of the fitness instructor from the reference video and background pixels that match the background of the user 206 in the viewing environment 200.

As another example, the computing system 100 can cause the content-presentation device 202 to display a user interface with a selectable option that, when selected by the user 206 (e.g., using a remote control), causes the computing system 100 to generate, in real-time, a modified version of the reference video based on lighting characteristics of the synthetic video and/or based on the received video. Example characteristics of how the reference video can be modified include, for instance, style of space (public gym, indoors, outdoors, etc.), living room decor (mid-century modern, retro, etc.), time of day (night, morning, day, etc.), and/or weather outside (rain, sunshine, etc.).

Figure 6:
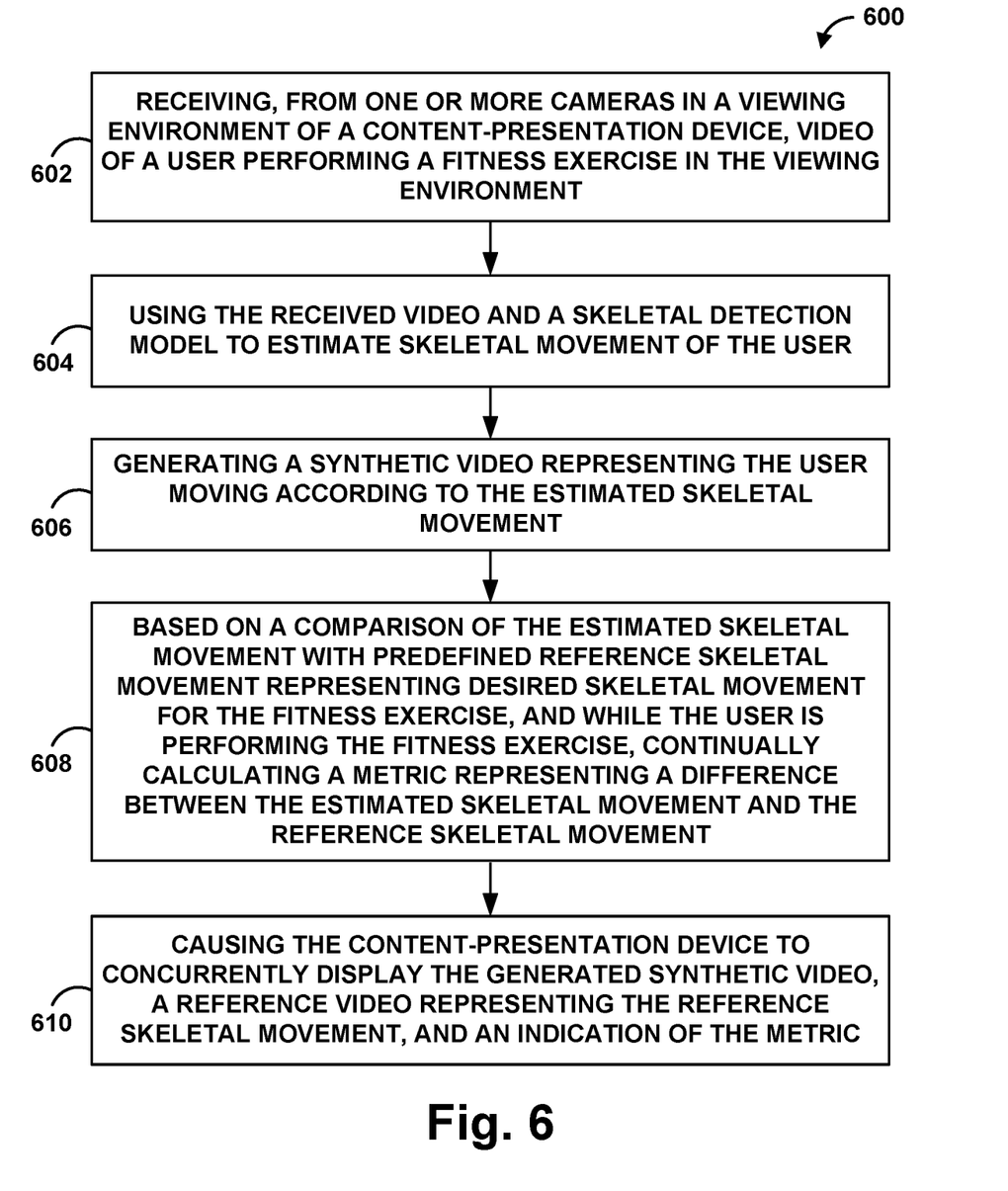
FIG. 6 is a flow chart of an example method.

FIG. 6 is a flow chart illustrating an example method 600. The method 600 can be carried out by the computing system 100. At block 602, the method 600 includes receiving, from one or more cameras in a viewing environment of a content-presentation device, video of a user performing a fitness exercise in the viewing environment. At block 604, the method 600 includes using the received video and a skeletal detection model to estimate skeletal movement of the user. At block 606, the method 600 includes generating a synthetic video representing the user moving according to the estimated skeletal movement. At block 608, the method 600 includes based on a comparison of the estimated skeletal movement with predefined reference skeletal movement representing desired skeletal movement for the fitness exercise, and while the user is performing the fitness exercise, continually calculating a metric representing a difference between the estimated skeletal movement and the reference skeletal movement. At block 610, the method 600 includes causing the content-presentation device to concurrently display the generated synthetic video, a reference video representing the reference skeletal movement, and an indication of the metric.

Figure 7:
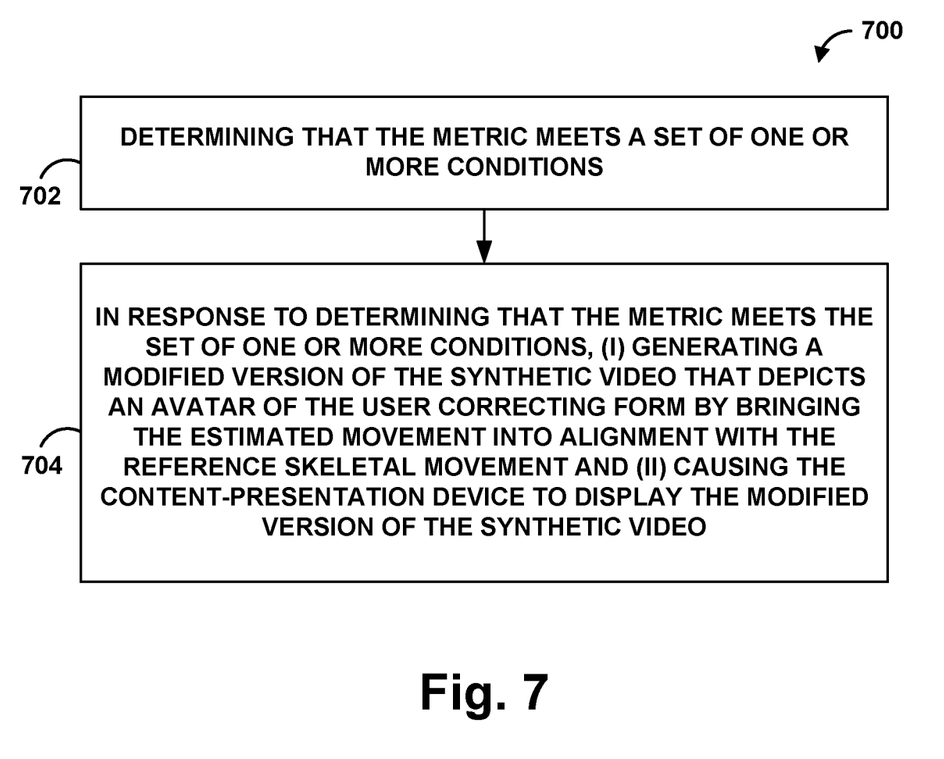
FIG. 7 is a flow chart of another example method.

FIG. 7 is a flow chart illustrating another example method 700. In some implementations, the method 700 can be performed in addition to method 600. The method 700 can be carried out by the computing system 100. At block 702, the method 700 includes determining that the metric meets a set of one or more conditions. At block 704, the method 700 includes in response to determining that the metric meets the set of one or more conditions, (i) generating a modified version of the synthetic video that depicts an avatar of the user correcting form by bringing the estimated movement into alignment with the reference skeletal movement and (ii) causing the content-presentation device to display the modified version of the synthetic video.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A computing system comprising a processor and a non-transitory computer-readable medium having stored thereon program instructions that upon execution by the processor causes performance of a set of acts comprising:
receiving, from one or more cameras in a viewing environment of a content-presentation device, video of a user performing a fitness exercise in the viewing environment;
using the received video and a skeletal detection model to estimate skeletal movement of the user;
generating a synthetic video representing the user moving according to the estimated skeletal movement;
based on a comparison of the estimated skeletal movement with predefined reference skeletal movement representing desired skeletal movement for the fitness exercise, and while the user is performing the fitness exercise, continually calculating a metric representing a difference between the estimated skeletal movement and the reference skeletal movement;
causing the content-presentation device to concurrently display the generated synthetic video, a reference video representing the reference skeletal movement, and an indication of the metric;
determining, by the computing system, an occurrence in which the calculated metric falls below a predefined threshold of the computing system; and
responsive to determining, by the computing system, the occurrence in which the calculated metric falls below the predefined threshold of the computing system, the computing system responsively causing a decrease of an audio volume level associated with the received video, thereby decreasing a volume level of audio being output via at least one sound speaker associated with the computing system.

2. The computing system of claim 1, wherein concurrently displaying the synthetic video and the reference video comprises concurrently displaying a first avatar or live video of the user moving according to the estimated skeletal movement in a first region of a user interface and a second avatar moving according to the reference skeletal movement in a second region of the user interface, different from the first region.

3. The computing system of claim 1, wherein concurrently displaying the synthetic video and the reference video comprises concurrently displaying a first avatar or live video of the user moving according to the estimated skeletal movement and, overlaid over the first avatar, a second avatar moving according to the reference skeletal movement.

4. The computing system of claim 1, wherein the indication of the metric comprises a form score relative to the desired form for performance of the fitness exercise.

5. The computing system of claim 1, the set of acts further comprising:
determining that the metric meets a set of one or more conditions; and
in response to determining that the metric meets the set of one or more conditions, (i) generating a modified version of the synthetic video that depicts an avatar of the user correcting form by bringing the estimated movement into alignment with the reference skeletal movement and (ii) causing the content-presentation device to display the modified version of the synthetic video.

6. The computing system of claim 1, the set of acts further comprising:
determining that the metric meets a set of one or more conditions; and
in response to determining that the metric meets the set of one or more conditions, causing one or more of the content-presentation device or an Internet of Things (IoT) device in the viewing environment to perform one or more actions of a set of actions, the set of actions comprising (i) playing audio in the viewing environment and (ii) emitting light in accordance with one or more light control parameters.

7. The computing system of claim 1, the set of acts further comprising:
receiving, from a wearable computing system, one or more of gyroscope data or accelerometer data; and
based on the synthetic video and the received data:
calculating a number of reps performed by the user, and
based on the calculated number of reps performed by the user, causing one or more of the content-presentation device or an Internet of Things (IoT) device in the viewing environment to perform one or more actions of a set of actions, the set of actions comprising (i) playing audio in the viewing environment and (ii) emitting light in accordance with one or more light control parameters.

8. The computing system of claim 1, the set of acts further comprising:
receiving, from a wearable computing system, heart rate data for the user; and
based on the received heart rate data, causing one or more of the content-presentation device or an Internet of Things (IoT) device in the viewing environment to perform one or more actions of a set of actions, the set of actions comprising (i) playing audio in the viewing environment and (ii) emitting light in accordance with one or more light control parameters.

9. The computing system of claim 1, the set of acts further comprising:
receiving, from a wearable computing system, heart rate data for the user; and
based on one or more of the received heart rate data or the metric, causing the content-presentation device to instruct the user to perform a different fitness exercise.

10. The computing system of claim 1, wherein:
the one or more cameras comprise a first camera mounted proximate to the content-presentation device and a second camera of a portable computing system located within the viewing environment,
the video comprises first video of the user performing the fitness exercise from a first angle and second video of the user performing the fitness exercise from a second angle, different from the first angle,
the portable computing system is configured to execute a fitness-themed software application, and
the portable computing system is selected from the group consisting of a smartphone, a laptop computer, or a tablet computer.

11. The computing system of claim 1, the set of acts further comprising:
receiving an instructional video of a fitness instructor performing the fitness exercise;
using the instructional video and the skeletal detection model to estimate skeletal movement of the fitness instructor; and
selecting the estimated skeletal movement of the fitness instructor to be the reference skeletal movement.

12. The computing system of claim 1, wherein:
the synthetic video comprises an avatar of the user moving according to the estimated skeletal movement, and
the avatar comprises a visual indication of one or more muscles targeted by the fitness exercise.

13. The computing system of claim 1, the set of acts further comprising:
after the user has stopped performance of the fitness exercise, causing the content-presentation device to display an avatar of the user including one or more muscles that are in recovery as a result of performance of the fitness exercise.

14. A method performed by a computing system comprising a processor and a non-transitory computer-readable medium, the method comprising:
receiving, from one or more cameras in a viewing environment of a content-presentation device, video of a user performing a fitness exercise in the viewing environment;
using the received video and a skeletal detection model to estimate skeletal movement of the user;
generating a synthetic video representing the user moving according to the estimated skeletal movement;
based on a comparison of the estimated skeletal movement with predefined reference skeletal movement representing desired skeletal movement for the fitness exercise, and while the user is performing the fitness exercise, continually calculating a metric representing a difference between the estimated skeletal movement and the reference skeletal movement;
causing the content-presentation device to concurrently display the generated synthetic video, a reference video representing the reference skeletal movement, and an indication of the metric;
determining, by the computing system, an occurrence in which the calculated metric falls below a predefined threshold of the computing system; and
responsive to determining, by the computing system, the occurrence in which the calculated metric falls below the predefined threshold of the computing system, the computing system responsively causing a decrease of an audio volume level associated with the received video, thereby decreasing a volume level of audio being output via at least one sound speaker associated with the computing system.

15. The method of claim 14, further comprising:
receiving, from a wearable computing system, one or more of gyroscope data or accelerometer data; and
based on the synthetic video and the received data:
calculating a number of reps performed by the user, and
based on the calculated number of reps performed by the user, causing one or more of the content-presentation device or an Internet of Things (IoT) device in the viewing environment to perform one or more actions of a set of actions, the set of actions comprising (i) playing audio in the viewing environment and (ii) emitting light in accordance with one or more light control parameters.

16. The method of claim 14, further comprising:
receiving, from a wearable computing system, heart rate data for the user; and
based on the received heart rate data, causing one or more of the content-presentation device or an Internet of Things (IoT) device in the viewing environment to perform one or more actions of a set of actions, the set of actions comprising (i) playing audio in the viewing environment and (ii) emitting light in accordance with one or more light control parameters.

17. The method of claim 14, wherein:
the one or more cameras comprise a first camera mounted proximate to the content-presentation device and a second camera of a portable computing system located within the viewing environment,
the video comprises first video of the user performing the fitness exercise from a first angle and second video of the user performing the fitness exercise from a second angle, different from the first angle,
the portable computing system is configured to execute a fitness-themed software application, and
the portable computing system is selected from the group consisting of a smartphone, a laptop computer, or a tablet computer.

18. The method of claim 14, further comprising:
determining that the metric meets a set of one or more conditions; and
in response to determining that the metric meets the set of one or more conditions, (i) generating a modified version of the synthetic video that depicts an avatar of the user correcting form by bringing the estimated movement into alignment with the reference skeletal movement and (ii) causing the content-presentation device to display the modified version of the synthetic video.

19. The method of claim 14, further comprising:
determining that the metric meets a set of one or more conditions; and
in response to determining that the metric meets the set of one or more conditions, causing one or more of the content-presentation device or an Internet of Things (IoT) device in the viewing environment to perform one or more actions of a set of actions, the set of actions comprising (i) playing audio in the viewing environment and (ii) emitting light in accordance with one or more light control parameters.

20. A non-transitory computer-readable medium having stored thereon program instructions that upon execution by a computing system, cause performance of a set of acts comprising:
receiving, from one or more cameras in a viewing environment of a content-presentation device, video of a user performing a fitness exercise in the viewing environment;
using the received video and a skeletal detection model to estimate skeletal movement of the user;
generating a synthetic video representing the user moving according to the estimated skeletal movement;
based on a comparison of the estimated skeletal movement with predefined reference skeletal movement representing desired skeletal movement for the fitness exercise, and while the user is performing the fitness exercise, continually calculating a metric representing a difference between the estimated skeletal movement and the reference skeletal movement;
causing the content-presentation device to concurrently display the generated synthetic video, a reference video representing the reference skeletal movement, and an indication of the metric;
determining, by the computing system, an occurrence in which the calculated metric falls below a predefined threshold of the computing system; and
responsive to determining, by the computing system, the occurrence in which the calculated metric falls below the predefined threshold of the computing system, the computing system responsively causing a decrease of an audio volume level associated with the received video, thereby decreasing a volume level of audio being output via at least one sound speaker associated with the computing system.

\* \* \* \* \*